United States Patent

[11] 3,583,291

[72] Inventor Edward J. Zeedik
 Brookpart, Ohio
[21] Appl. No. 850,044
[22] Filed Aug. 14, 1969
[45] Patented June 8, 1971
[73] Assignee TRW Inc
 Cleveland, Ohio

[54] PISTON
 10 Claims, 8 Drawing Figs.
[52] U.S. Cl. .................................................. 92/158,
 92/233, 92/237
[51] Int. Cl. .................................................. F01b 31/10
[50] Field of Search .......................................... 92/158,
 159, 160, 233, 237, 238

[56] References Cited
UNITED STATES PATENTS
2,656,228 10/1953 Marien ........................ 92/160

3,179,021 4/1965 Holcombe ..................... 92/158
3,494,262 2/1970 Holcombe ..................... 92/159

Primary Examiner—Martin P. Schwadron
Assistant Examiner—Allen M. Ostrager
Attorney—Hill, Sherman, Meroni, Gross and Simpson ABSTRACT: A piston for use in internal combustion engines having inexpensive means for draining oil from the oil ring groove to the pin bosses which can be produced by permanent mold casting procedures, forging, or die casting, without machine drilling, milling or cutting operations. The piston has a ring grooved head with a depending skirt indented at the pin bosses, and radial shoulders under the head outwardly from the indented portions of the skirt have recesses therein communicating with the oil ring groove, and positioned to direct oil along the sides of the pin bosses. The pin boss sides are grooved so that oil from these recesses will drain into the pin holes to lubricate the wrist pin.

INVENTOR.
Edward J. Zeedik

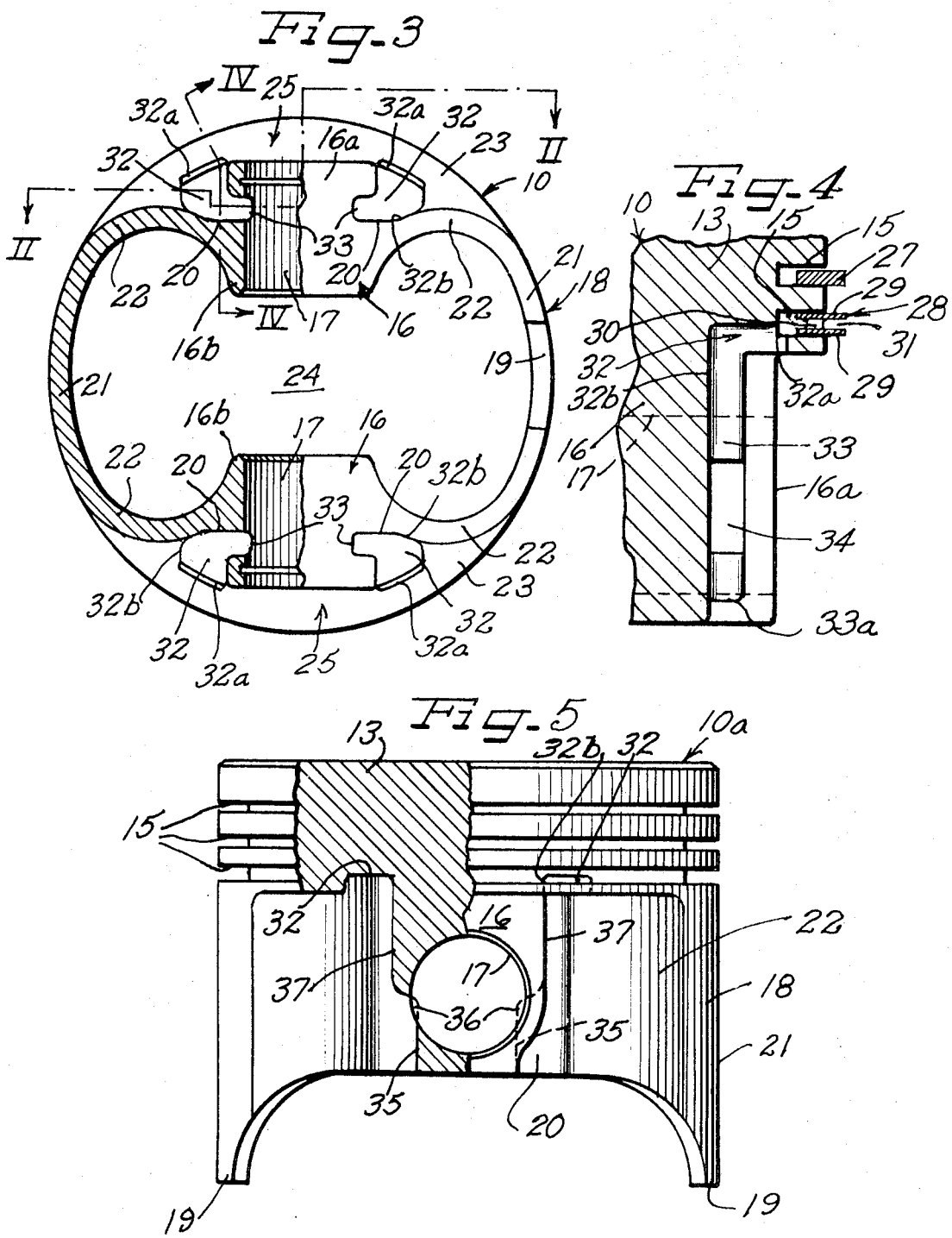

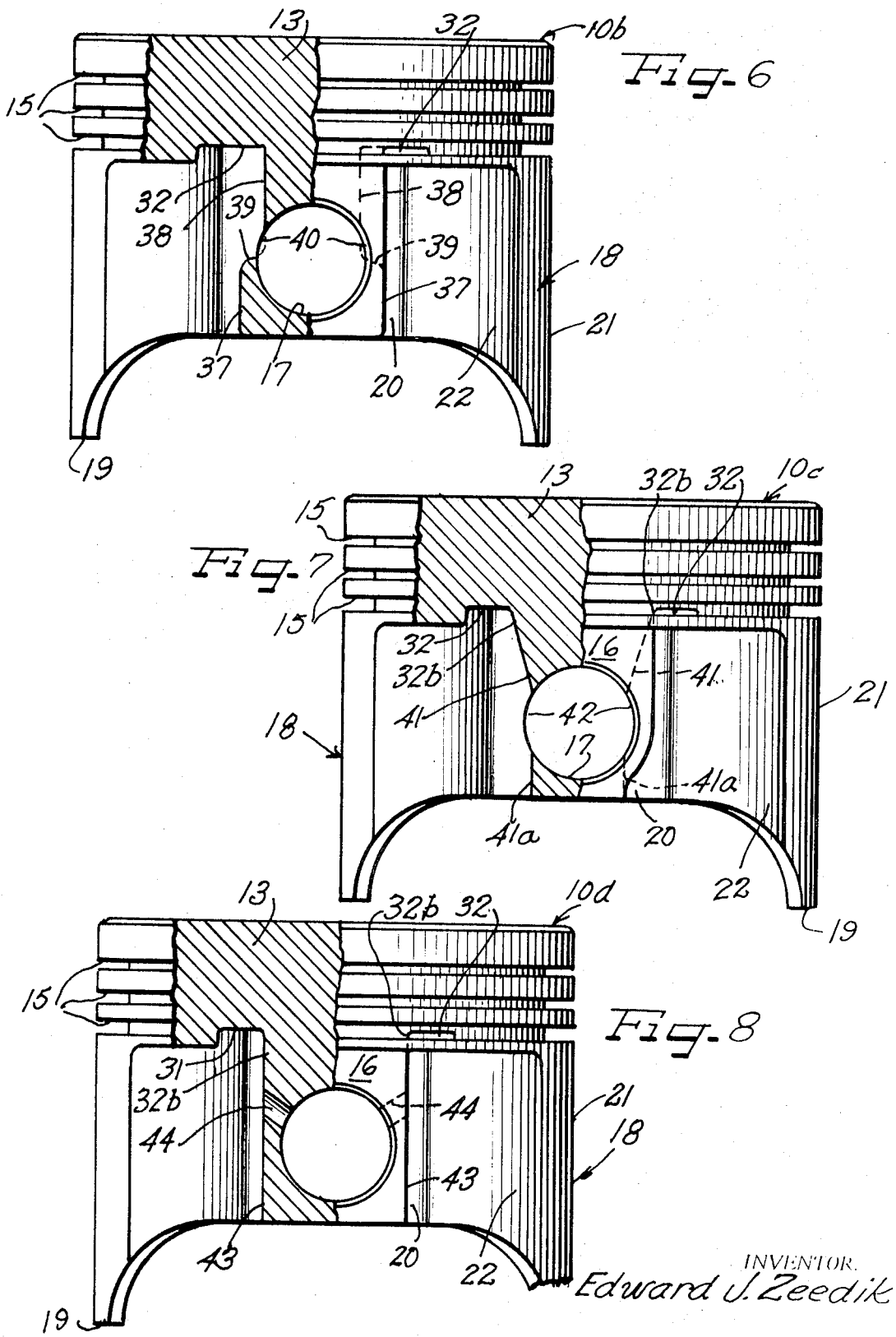

PISTON

BACKGROUND OF THE INVENTION

1. Field of the Invention

This invention pertains to the art of lubricating the pin bosses of internal combustion engine pistons and, more particularly, relates to the provision of oil passages from the oil ring groove of a piston to the pinholes of the wrist pin bosses without drilling, milling, or otherwise machining the piston.

2. Description of the Prior Art

Lubrication of pin boss bearing surfaces in pistons is known in the prior art as, for example, in the Wallace B. Holcombe U.S. Pat. No. 3,179,021 dated Apr. 20, 1965. This type of pin boss lubrication, however, only feeds the pin bosses with oil from inside of the skirt. Attempts to extend the lubrication of the pin bosses from oil scraped from the engine cylinder around the skirt have required expensive machining and drilling operations.

SUMMARY OF THE INVENTION

The present invention now effects the lubrication of pin boss bearing surfaces in pistons with oil received from the engine cylinder without requiring machining operations to provide communication between the interior of the pin bosses and the engine cylinder. The pistons of this invention have indented skirt areas adjacent the pin boss axis into which the outboard ends of the pin bosses extend. These chambers underlie radial shoulders on the piston head, and oil is trapped in these chambers on the downstroke of the piston. Recesses are formed in the piston during its manufacture to feed this trapped oil into the wrist pin bosses. In addition, recesses are also formed in communication with the oil ring groove of the piston so that oil scraped from the cylinder by the oil ring will also be fed through the oil ring groove to drain into the interiors of the pin bosses.

In the preferred arrangements the outboard end portions of the pin bosses have grooves along the sides thereof extending through the pinholes of the bosses, and the overlying radial shoulders of the piston head are recessed to discharge oil from the oil ring groove into these pin boss grooves. The skirt of the piston converges toward the pin boss grooves so as to provide a confined drain path for the oil, creating somewhat of a plunger action on the downstroke of the piston to force this oil into the pin bores.

It is then an object of this invention to provide pistons with pin boss lubrication from the oil ring groove of the piston without requiring machining or finishing operations on the piston.

Another object of this invention is to provide pistons which will force oil from the engine cylinder into the wrist pin bores of the piston without resorting to the drilling or milling of passages in the piston.

Another object of this invention is to provide a cast or forged internal combustion engine piston with recesses formed in the piston during the casting or forging which will feed oil from the engine cylinder into the pin bosses of the piston.

A still further object of this invention is to provide an internal combustion engine piston with oil receiving chambers under the piston head and outside of the piston skirt which are in communication with the interior of the pin bosses of the piston.

A specific object of the invention is to provide an internal combustion engine piston with indented skirt portions at the wrist pin axis, pin bosses having outboard ends beyond the skirt portions, radial shoulders underlying the piston head above the outboard ends of the pin bosses and recesses in these radial shoulders communicating with the bottom ring groove of the piston for draining oil from this ring groove to the pin bosses.

Other objects, features and advantages of this invention will be readily apparent from the following description of certain preferred embodiments thereof, taken in conjunction with the accompanying drawings, although variations and modifications may be effected without departing from the spirit and scope of the novel concepts of the disclosure.

BRIEF DESCRIPTION OF THE DRAWINGS

FIG. 3 is a bottom plan view of the piston of FIGS. 1 and 3, with a portion broken away and taken generally along the section line III–III of FIG. 2;

FIG. 4 is a fragmentary cross-sectional view taken generally along the line IV–IV of FIG. 3;

FIGS. 5—8 are views similar to FIG. 2, but illustrating modified oil drain passages for pistons of this invention.

DESCRIPTION OF THE PREFERRED EMBODIMENTS

Figure 1:
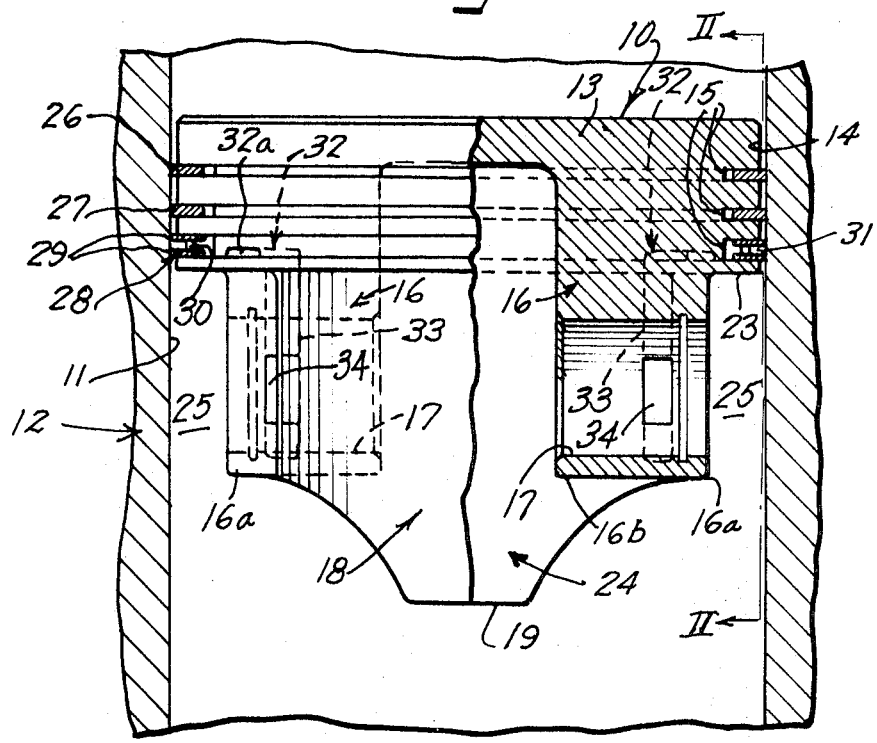
FIG. 1 is an elevational view of a piston according to this invention mounted in an engine cylinder, with a portion broken away and shown in central vertical cross section.

In FIG. 1 the piston 10 of this invention is illustrated as being reciprocably mounted in the bore 11 of an engine cylinder 12. The piston 10 is a one-piece, preferably aluminum alloy piston formed either by casting, die-forging, or extrusion. The piston 10 has a circular head 13, a cylindrical ring belt or sidewall 14 with three piston ring grooves 15 therein, a pair of diametrically opposed pin bosses 16 depending from the head 13, with aligned wrist pin receiving apertures or bores 17 therethrough adjacent their bottom ends and an undulated skirt 18 depending from the ring belt or sidewall 14 to a scalloped bottom edge with tail portions 19 at a level below the bottoms of the pin bosses 16 and displaced 90° therefrom. The undulated skirt 18, as best shown in FIG. 3, has indented flat sidewalls 20 intermediate the ends of the pin bosses 16 and on both sides of the pin bosses and cylindrical cylinder wall engaging portions 21 normal to the pin boss axis with bowed or curved walls 22 joining the flat walls 20 with the cylindrical walls 21. Flat radial shoulders 23 are provided under the ring belt or sidewall 13 outwardly from the skirt walls 20 and 22.

The pin bosses 16 have outboard ends 16a projecting beyond the skirt walls 20 and 22 and extending from the shoulders 23 to the bottoms of the pin bosses. The pin bosses also have inboard ends 16b radially inward from the flat walls 20. The inboard ends 16b extend radially into the interior of the skirt and terminate in spaced opposed aligned relation to receive the piston connecting rod therebetween (not shown). The apertures or bores 17 through the pin bosses 16 are thus in open communication at their inner ends with a chamber 24 under the piston head surrounded by the piston skirt, while the outer ends of these bores 17 are in communication with chambers 25 outside of the skirt and bounded by the skirt walls 20 and 22, the shoulders 23, and the bore 11 of the cylinder 12. The chambers 24 and 25 have open bottoms communicating freely with the crankcase area of the engine in which the piston operates.

As shown in FIG. 1, the top ring groove 15 of the piston head 13 receives a solid metal piston ring 26 which is split, as conventional, to be snapped into the groove, and which provides the top fire ring for the piston. The second ring groove 15 receives a compression piston ring 27, also of solid metal configuration, similar to the ring 26. The third or bottom ring groove 15, as also shown in FIG. 4, however, receives a slotted oil ring 28 with axially spaced top and bottom narrow peripheral band portions 29 riding on the cylinder bore 11, and with radial slots 30 between these bands 29 connecting the channel 31 between the bands with the bottom of the ring groove 15 so that oil scraped from the bore 11 by the bands 29 will drain into the bottom of the ring groove.

Figure 2:
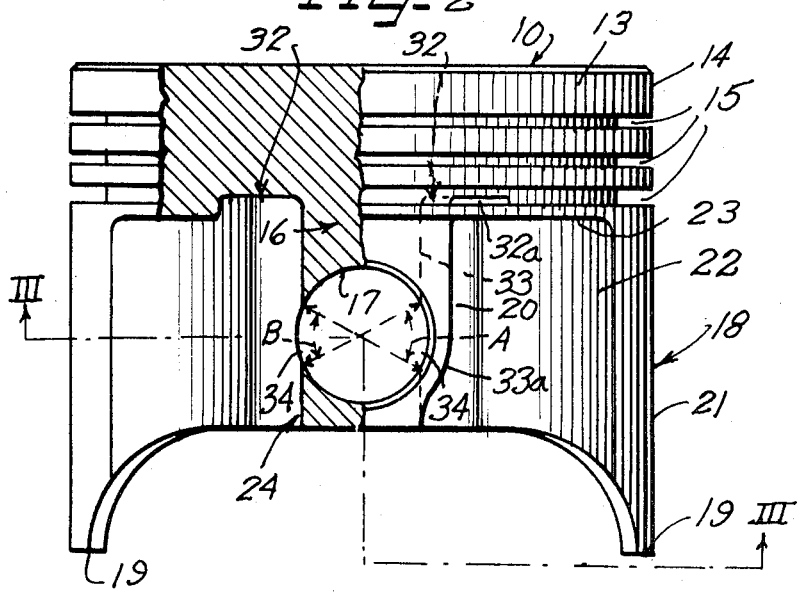
FIG. 2 is an elevational view of the piston of FIG. 1 taken generally along the line II–II of FIG. 1, with a portion of the piston broken away and shown in cross section generally along the line II–II of FIG. 3.

According to this invention, the bottom of the ring groove is communicated with the bores 17 of the pin bosses 16 by four recesses 32 in the bottom face of the radial shoulders 23. These recesses 32 straddle the outboard ends 16a of the pin bosses and communicate with the bottom of the bottom ring groove 15 at their radial outer ends as shown at 32a. The radial inner ends 32b of these recesses 32 follow the contour of the skirt walls 20 and 22 and overlie vertical grooves 33 in the side faces of the pin bosses. These vertical grooves 33 are deep enough to cut through the sidewalls of the pin bosses at 34 along quadrants extending from about the 2 o'clock to the 4 o'clock position at one side and from about the 8 o'clock to the 10 o'clock position on the other side. Thus, the hole 34 on the right side of the pin boss shown in FIG. 2 lies in the quadrant A between the arrows, while the hole 34 on the left side of the pin boss lies in the quadrant B between the arrows. The slots 33 have open bottoms 33a draining into the bottoms of the chambers 25.

The recesses 32 and the slots 33 are conveniently formed during the molding or forging of the piston, since they are open-faced and can be formed by molding and forging dies. By means of these recesses and slots, oil from the bottom oil ring groove and oil in the chambers 25 between the indented piston skirt portions and cylinder wall under the piston head will flow into the pin boss bores 17 to lubricate the bearing walls of the bores. Lubrication is through openings on both lateral sides of the pin bores intermediate the inboard and outboard ends of the pin bosses, and free flow of lubricant around the entire bore of each pin boss is ensured.

In the modified piston 10a of FIG. 5 parts identical with parts described in FIGS. 1—4 have been marked with the same reference numerals. In FIG. 5, however, the outboard ends of the pin bosses 16 only have vertical grooves 35 in the bottoms thereof piercing the pin boss bores 17 at 36 in the bottom half of the bore. Oil drains from the recesses 32 along the side faces 37 of the outboard ends of the pin bosses, and then flows into the grooves 35 in communication with the pin boss bores 17, as illustrated at 36 in FIG. 5. In this arrangement the radial inner ends 32b of the recesses 32 register with the outer faces 37 of the outboard ends of the pin bosses 16, and the oil drainage into the grooves 35 thus lubricates the pin bosses 17 at their bottom lateral sides.

In the further modified piston 10b of FIG. 6 the outboard ends of the pin bosses 16 have vertically grooved sidewalls only in their top half portions. Thus, as shown in FIG. 6, grooves 38 in the side faces 37 of the pin bosses 16 terminate at 39 level with the horizontal diameter of the pin boss bores 17 and pierce these bores at 40 in the upper lateral quarters of the bores. Oil drainage from the recesses 32 into the grooves 38 occurs at the radial inner ends of the recesses 32 in the same manner as in FIGS. 1—4, but instead of extending the grooves 33 clear through the bottoms of the pin bosses, they terminate at levels adjacent the horizontal diameter of the pin boss bores. The oil then drains to the outer faces of the pin bosses.

In the still further modified piston 10c of FIG. 7, the lateral sides of the outboard ends of the pin bosses 16 have tapered grooves 41 converging from the radial inner ends 32b of the recesses 32 into the lateral top quadrants of the pin boss bores 17 to pierce the bores at 42 over an extended lateral area. These grooves 41 have open bottoms 41a. The grooves 41 are thus similar to the grooves 33 except that their top halves are tapered and mate with the inboard ends of the recesses 32, which are not extended radially inward as much as in the piston 10 of FIGS. 1—4.

In the further embodiment of FIG. 8, the piston 10d has pin bosses 16 with ungrooved sidewalls 43 at their outboard ends, and these sidewalls are flush with the radial inner ends 32b of the recesses 32. Downwardly sloping cylindrical holes 44 join the sidewalls 43 with the pin boss bores 17. These holes 44 can be molded into the pin bosses by core pins or the like. Oil from the recesses 32 thus flows along the side faces 43 of the pin bosses, drains into the holes 44 and into the top lateral quadrants of the pin bores 17 to lubricate the bore surfaces.

From the above descriptions it will be understood that many arrangements of pin boss lubrication are within the scope of this invention, that lubrication of the pin boss bores from the oil ring grooves of pistons is accomplished without drilling, milling or other machining operations, and that oil is fed into the outboard ends of the pin bosses from chambers between the cylinder and the head and skirt of the piston.

What I claim is:

1. An internal combustion engine piston having a head portion, a depending skirt portion and depending pin boss portions, the skirt portion being undulated at the pin boss portions to provide chambers under the piston head at the outboard ends of each pin boss portion, said piston head portion having peripheral piston ring grooves therearound and radial shoulders under the bottom ring groove overlying the chambers provided by the undulated skirt at the outboard ends of the pin bosses, recesses in said shoulders of the head communicating with the bottom ring groove and with the lateral sides of the outboard ends of the pin bosses, and passageways in the lateral sides joining the recesses with the pin boss bores whereby oil in said chambers and oil from the bottom ring groove will flow into the pin boss bores to lubricate the surfaces thereof.

2. A piston having lubricated pin bosses and free from drilled holes, which comprises a one-piece cylindrical metal member having a head with peripheral ring grooves, diametrically opposed shoulders on the head underlying the bottom ring groove, a skirt depending from the head having cylinder wall engaging faces between the shoulders, pin bosses depending from the head having outboard ends underlying the shoulders, recesses in the head communicating with the outboard ends of the pin bosses under said shoulders, and open grooves on the outside of the outboard ends of the pin bosses communicating with said recesses and with the interiors of portions of the pin bosses for feeding oil from the oil ring groove to the pin boss bores.

3. An internal combustion engine piston having lubricated pin boss bores which comprises a piston having a cylindrical head with ring grooves therearound and radial shoulders underlying the piston head at diametrically opposed quadrants of the piston, pin bosses depending from said head having outboard ends underlying said shoulders, recesses in said shoulders communicating with the bottom ring groove and with the outboard ends of the pin bosses, vertical grooves in said outboard ends of the pin bosses communicating with said recesses, and said grooves piercing the lateral sides of the pin boss bores whereby oil from the bottom ring groove of the piston will drain into the pin boss bores through said recesses and grooves.

4. A piston for operating in a cylinder comprising a head portion, a skirt portion having indented sides adjacent the pin bosses, said pin bosses having inboard ends inside the skirt and outboard ends projecting radially beyond the indented sides of the skirt, said head having shoulders adjacent to and above the outboard ends of said pin bosses, said indented sides of the skirt and said shoulders cooperating with the cylinder in which the piston operates to provide open bottom chambers around the outboard ends of the pin bosses, and apertures in said pin bosses joining open channels in said chambers with the pin boss bores intermediate the inboard and outboard ends of the pin bosses to lubricate the bores with oil from the chambers.

5. The piston of claim 1 wherein the passageways communicating with the recesses are vertical grooves in the lateral side faces of the outboard ends of the pin bosses.

6. The piston of claim 1 wherein the piston skirt surrounds the inboard ends of the pin bosses and is indented at the outboard ends thereof to provide chambers underlying the piston head receiving the outboard ends of the pin bosses and wherein said passageways join said chambers with the interiors of the pin bosses.

7. The piston of claim 2 wherein the skirt has indented flat portions at the pin boss axis and the pin bosses extend on both sides of these flattened portions to have inboard ends inside of the skirt and outboard ends outside of the skirt.

8. The piston of claim 3 wherein the recesses in the radial shoulders of the piston head are bounded at their inboard ends by the outboard ends of the pin bosses and by the piston skirt.

9. The piston of claim 3 wherein the piston skirt cooperates with the pin bosses to provide notched areas communicating with the recesses.

10. The piston of claim 4 wherein the apertures are provided by grooves in the lateral sides of the outboard ends of the pin bosses piercing the pin boss bores.